(12) United States Patent
Jung et al.

(10) Patent No.: US 12,491,478 B2
(45) Date of Patent: Dec. 9, 2025

(54) POLYOLEFIN RESIN COMPOSITION FOR POROUS FILM

(71) Applicant: LOTTE CHEMICAL CORPORATION, Seoul (KR)

(72) Inventors: Sun Young Jung, Daejeon (KR); Chang Kyu Son, Daejeon (KR); Min Suk Jung, Daejeon (KR); Hee Won Cho, Daejeon (KR); Kyung Hoon Kim, Daejeon (KR)

(73) Assignee: LOTTE CHEMICAL CORPORATION, South (KR)

( * ) Notice: Subject to any disclaimer, the term of this patent is extended or adjusted under 35 U.S.C. 154(b) by 196 days.

(21) Appl. No.: 18/253,330

(22) PCT Filed: Nov. 5, 2021

(86) PCT No.: PCT/KR2021/016074
§ 371 (c)(1),
(2) Date: May 17, 2023

(87) PCT Pub. No.: WO2022/108210
PCT Pub. Date: May 27, 2022

(65) Prior Publication Data
US 2024/0024825 A1    Jan. 25, 2024

(30) Foreign Application Priority Data

Nov. 18, 2020  (KR) .......... 10-2020-0154902

(51) Int. Cl.
| | | |
|---|---|---|
| *B01D 67/00* | (2006.01) | |
| *B01D 71/26* | (2006.01) | |
| *C08L 23/06* | (2006.01) | |
| *C08L 23/12* | (2006.01) | |

(52) U.S. Cl.
CPC ....... *B01D 67/0027* (2013.01); *B01D 71/261* (2022.08); *B01D 71/262* (2022.08); *C08L 23/06* (2013.01); *C08L 23/12* (2013.01); *B01D 2323/081* (2022.08); *B01D 2325/04* (2013.01); *B01D 2325/24* (2013.01); *B01D 2325/26* (2013.01); *C08L 2205/025* (2013.01); *C08L 2207/062* (2013.01)

(58) Field of Classification Search
CPC .............. B01D 67/0027; B01D 71/261; B01D 71/262; B01D 2323/081; B01D 2325/04; B01D 2325/24; B01D 2325/26; B01D 69/02; B01D 2325/52; C08L 23/06; C08L 23/12; C08L 2205/025; C08L 2207/062; Y02E 60/10; H01M 50/409; H01M 50/411; H01M 50/417
See application file for complete search history.

(56) References Cited

U.S. PATENT DOCUMENTS

| | | | | |
|---|---|---|---|---|
| 4,650,730 A | * | 3/1987 | Lundquist ........... | H01M 50/449 429/62 |
| 4,789,609 A | * | 12/1988 | Ambrose-Ritchey ........................ | H01M 50/449 429/144 |
| 5,250,240 A | * | 10/1993 | Kim ..................... | B01D 71/262 264/209.3 |
| 2015/0191597 A1 | * | 7/2015 | Hacker ..................... | E04D 1/00 524/68 |
| 2015/0325830 A1 | * | 11/2015 | Li ........................ | H01M 50/494 429/145 |
| 2017/0342248 A1 | * | 11/2017 | Van Houcke ........... | C08L 23/06 |
| 2024/0392083 A1 | * | 11/2024 | Kawaguchi ................ | C08J 9/26 |

FOREIGN PATENT DOCUMENTS

| | | | | |
|---|---|---|---|---|
| JP | 63156842 A | | 6/1988 | |
| JP | 2001213989 A | | 8/2001 | |
| JP | 2007224460 A | | 9/2007 | |
| JP | 2013087275 A | | 5/2013 | |
| KR | 20010068785 A | * | 7/2001 | ......... B01D 67/0027 |
| KR | 20100111746 A | | 10/2010 | |
| KR | 20120069611 A | | 6/2012 | |
| KR | 101305264 B1 | | 9/2013 | |
| KR | 20190059859 A | | 5/2019 | |
| WO | 2019/093184 A1 | | 5/2019 | |
| WO | 2020/195380 A1 | | 10/2020 | |

OTHER PUBLICATIONS

International Search Report issued in International Application No. PCT/KR2021/016074 dated Feb. 14, 2022 (3 pages).
Written Opinion issued in International Application No. PCT/KR2021/016074 dated Feb. 14, 2022 (4 pages).
Office Action issued in Japanese Application No. 2023-526079, mailed on Jul. 18, 2025 (8 Pages).

* cited by examiner

*Primary Examiner* — Nahida Sultana
(74) *Attorney, Agent, or Firm* — Osha Bergman Watanabe & Burton LLP

(57) ABSTRACT

Disclosed are a polyolefin resin composition usable in manufacturing a single-layered dry porous membrane having excellent meltdown and shutdown properties, and a porous membrane using the polyolefin resin composition. The present invention provides a polyolefin resin composition for a porous membrane, wherein the polyolefin resin composition includes 30 wt % to 70 wt % of a high-density polyethylene having a melt flow index (190° C., 2.16 kg load) of 0.1 g/10 min to 5 g/10 min, a crystallization temperature of 115° C. to 125° C., and a degree of crystallinity of 75% or greater, and 30 wt % to 70 wt % of a high-crystallinity polypropylene having a melt flow index (230° C., 2.16 kg load) of 5 g/10 min to 20 g/10 min.

2 Claims, No Drawings

POLYOLEFIN RESIN COMPOSITION FOR POROUS FILM

TECHNICAL FIELD

The present invention relates to a polyolefin resin composition for a porous membrane, and more specifically, to a polyolefin resin composition for a porous membrane having excellent meltdown and shutdown properties.

This application claims the benefit of Korean Patent Application No. 10-2020-0154902, filed on Nov. 18, 2020, in the Korean Intellectual Property Office, the disclosure of which is incorporated herein in its entirety by reference.

BACKGROUND ART

Porous membranes are widely used in applications to separate and divide specific components such as secondary battery separators and filtration membranes. Polyolefins are used in film-type porous membranes, whose demand has been increasing in recent years, and with the increasing demand, the usage amount of the material is also gradually increasing. Among the polyolefins, a polyethylene capable of satisfying required physical properties despite its thin thickness is in a clearly increasing demand.

Recently, in response to the higher capacity and higher output of secondary batteries, the issue of battery safety has been highlighted, and polyolefin porous membranes are not used alone due to meltdown and shutdown properties problems, and are generally manufactured by stacking polypropylene microporous membranes and polyethylene microporous membranes. It is preferable that a battery has a relatively low shutdown temperature, and a relatively high meltdown temperature, and a polyethylene-based resin is applied for low shutdown properties, and a polypropylene-based resin is applied for high meltdown temperature (the temperature at a point of time at which a membrane breaks) properties.

As described above, a typical membrane for a battery is composed of a two-layered structure of a polypropylene porous layer/a polyethylene porous layer or a three-layered structure of a polypropylene porous layer/a polyethylene porous layer/a polypropylene porous layer, so that there are problems in that the production process is complex, there are many control variables, and manufacturing costs are also increased.

Korean Patent No. 1305264 discloses a polyolefin multi-layered microporous membrane formed by stacking a porous layer A made of polypropylene and a porous layer B made of a polyethylene-based resin in the order of the porous layer B/the porous layer A/the porous layer B, and only refers to a typical multi-layered membrane.

DISCLOSURE OF THE INVENTION

Technical Problem

An aspect of the present invention provides a polyolefin resin composition usable in manufacturing a single-layered dry porous membrane having excellent meltdown and shutdown properties, and a porous membrane using the polyolefin resin composition.

Technical Solution

According to an aspect of the present invention, there is provided a polyolefin resin composition for a porous membrane, wherein the polyolefin resin composition includes 20 wt % to 70 wt % of a high-density polyethylene having a melt flow index (190° C., 2.16 kg load) of 0.1 g/10 min to 5 g/10 min, a crystallization temperature of 115° C. to 125° C., and a degree of crystallinity of 75% or greater, and 30 wt % to 80 wt % of a high-crystallinity polypropylene having a melt flow index (230° C., 2.16 kg load) of 5 g/10 min to 20 g/10 min.

In addition, the resin composition has a shutdown temperature of 140° C. or lower, a meltdown temperature of 160° C. or higher, and a puncture strength of 520 gf or greater, as measured according to the following method.

[Measurement Method]

Extruding the resin composition in a T-die manner at 220° C. to 250° C. with a twin-screw extruder to be molded into a sheet, sequentially stretching the sheet in MD and TD directions in a stretching machine to prepare a single-layered porous film having a thickness of 15 μm, followed by placing a porous film specimen having a size of 50×50 mm on a plate with a hole having a diameter of 10 mm and pressing the specimen with a 1 mm probe to set a force by which the specimen is punctured as puncture strength, and heating a lithium ion secondary battery manufactured using the porous film in an oven at a rate of 2° C./min to measure resistance in real time, wherein the temperature at a point of time at which the resistance exceeds 10,000Ω is set as a shutdown temperature, and the temperature at a point of time at which the resistance rapidly decreases after the shutdown temperature is set as a meltdown temperature.

According to another aspect of the present invention, there is provided a porous membrane molded into a single layer using the resin composition.

Advantageous Effects

According to the present invention, in preparing a porous membrane by using a polyolefin resin, a high-density polyethylene having specific flowability and crystalline properties and a high-crystallinity polypropylene having specific flowability are mixed at a specific ratio to exclude a typical complex multi-layered structure, so that it is possible to provide a polyolefin resin composition for a porous membrane, the polyolefin resin composition capable of implementing excellent shutdown properties and meltdown properties while having a simple process through single-layer molding, and provide a porous membrane using the polyolefin resin composition.

MODE FOR CARRYING OUT THE INVENTION

Hereinafter, the present invention will be described in detail with reference to preferred embodiments. Prior to this, it will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention. Therefore, the configurations of the embodiments described herein are merely the most preferred embodiments of the present invention, and are not intended to limit the technical idea of the present invention. Therefore, it should be understood that there may be various equivalents and modifications that may substitute the embodiments at the time of the present application.

In preparing a membrane for a battery with enhanced safety by using a typical polyolefin resin, the present inventors have faced that a multi-layered membrane, in which a polyethylene-based resin is applied for low shutdown properties and a polypropylene-based resin is applied for high meltdown properties, has problems in terms of process and costs due to the complex structure thereof, and have repeatedly conducted research on a porous membrane using a polyolefin resin composition and implementing excellent shutdown and meltdown properties despite the single-layered structure thereof, and as a result, have confirmed that it is possible to achieve the above implementation even by a single-layer molding by mixing a high-density polyethylene having specific flowability and crystalline properties and a high-crystallinity polypropylene having specific flowability at a specific ratio, and have reached the present invention.

Therefore, the present invention discloses a polyolefin resin composition for a porous membrane, wherein the polyolefin resin composition includes 20 wt % to 70 wt % of a high-density polyethylene having a melt flow index (190° C., 2.16 kg load) of 0.1 g/10 min to 5 g/10 min, a crystallization temperature of 115° C. to 125° C., and a degree of crystallinity of 75% or greater, and 30 wt % to 80 wt % of a high-crystallinity polypropylene having a melt flow index (230° C., 2.16 kg load) of 5 g/10 min to 20 g/10 min.

The polyolefin resin composition according to the present invention improves the stability of a secondary battery by imparting shutdown properties to a membrane, and in the present invention, the 'shutdown' refers to properties of closing pores due to partial melting on a membrane above a specific temperature, and although a short circuit in which a positive electrode and a negative electrode are directly connected due to thermal deformation of the membrane at high temperature is the main cause of explosions and fire accidents, the short circuit may be prevented through the shutdown.

In addition, in the present invention, the 'meltdown' (or 'rupture') refers to a phenomenon in which a membrane is partially damaged due to melting on the membrane above a specific temperature, and when the phenomenon occurs, an accident such as fire or explosion may occur due to a short circuit in which a positive electrode and a negative electrode of a secondary battery are bonded.

In the present invention, the high-density polyethylene basically imparts low shutdown properties when a single-layered membrane is prepared using the same, but a high-density polyethylene having constant flowability and crystallinity properties is selected to maintain the low shutdown properties and to exert high meltdown properties inherent in a high-crystallinity polypropylene to be mixed through melt-mixing with the high-crystallinity polypropylene to be described later.

That is, in the present invention, the high-density polyethylene has a melt flow index (190° C., 2.16 kg load) of 0.1 g/10 min to 5 g/10 min, a crystallization temperature of 115° C. to 125° C., and a degree of crystallinity of 75% or greater, and preferably, may have a melt flow index of 0.5 g/10 min to 1.5 g/10 min, a crystallization temperature of 117° C. to 122° C., and a degree of crystallinity of 78% or greater, and when the limited melt flow index, crystallization temperature or degree of crystallinity ranges are deviated, even when a membrane is prepared as a single layer using a melt mixture with a high-crystallinity polypropylene, it is difficult to implement desired meltdown and shutdown properties.

The density of the high-density polyethylene may be 0.945 g/cm$^3$ to 0.985 g/cm$^3$, preferably 0.955 g/cm$^3$ to 0.975 g/cm$^3$.

The content of the high-density polyethylene may be 20 wt % to 70 wt %, preferably 30 wt % to 70 wt % in the total resin composition. When preparing a membrane, if the content is less than 20 wt %, the shutdown properties are degraded, and if greater than 70 wt %, the meltdown properties are degraded.

In the present invention, the high-crystallinity polypropylene imparts high meltdown properties when a single-layered membrane is prepared using the same, but a high-crystallinity polypropylene having constant flowability is selected to maintain the high meltdown properties and to exert low shutdown properties inherent in a high-density polyethylene to be mixed through melt-mixing with the above high-density propylene.

That is, in the present invention, the high-crystallinity polypropylene has a melt flow index (230° C., 2.16 kg load) of 5 g/10 min to 20 g/10 min, preferably 6 g/10 min to 10 g/10 min, and when the limited melt flow index is deviated, even when a membrane is prepared as a single layer using a melt mixture with a high-density propylene, it is difficult to implement desired meltdown and shutdown properties.

The high-crystallinity polypropylene has a degree of crystallinity of 53% or greater and a tacticity of 95% or greater, which is very high, and thus has a melting temperature of 165° C. or higher, exhibits high crystallization temperature properties, and has excellent mechanical properties such as high rigidity, high heat resistance, high impact resistance, scratch resistance, and high dimensional stability.

The content of the high-crystallinity polypropylene is 30 wt % to 80 wt % in the total resin composition, and preferably, may be 30 wt % to 70 wt %. When preparing a membrane, if the content is less than 30 wt %, the meltdown properties are degraded, and if greater than 80 wt %, the shutdown properties are degraded.

The polyolefin resin composition for a porous membrane according to the present invention may be prepared by mixing and extruding the above components according to a typical method known in the art. For example, the components may be introduced into a twin-screw extruder, melt-kneaded, and then solidified through cooling to prepare a polyolefin resin composition for a porous membrane in a pellet form.

The above-described polyolefin resin composition for a porous membrane according to the present invention may be used in manufacturing a single-layered dry porous membrane having excellent meltdown and shutdown properties and having excellent strength, and specifically, the shutdown temperature may be 140° C. or lower, preferably 136° C. or less, the meltdown temperature may be 160° C. or higher, preferably 163° C. or higher, and the puncture strength may be 520 gf or greater, preferably 550 gf or greater, which are measured according to the following method.

[Measurement Method]

Extruding the resin composition in a T-die manner at 220° C. to 250° C. with a twin-screw extruder to be molded into a sheet, sequentially stretching the sheet in MD and TD directions in a stretching machine to prepare a single-layered porous film having a thickness of 15 μm, followed by placing a porous film specimen having a size of 50×50 mm on a plate with a hole having a diameter of 10 mm and pressing the specimen with a 1 mm probe to set a force by which the specimen is punctured as puncture strength, and heating a lithium ion secondary battery manufactured using the porous film in an oven at a rate of 2° C./min to measure resistance in real time, wherein the temperature at a point of time at which the resistance exceeded 10,000Ω is set as a shutdown temperature, and the temperature at a point of time at which the resistance rapidly decreased after the shutdown temperature is set as a meltdown temperature. At this time, it is preferable that the cooling roll temperature is set to 0° C. to 150° C., and the winding speed is set to 5 m/min to 100 m/min at the time of molding the sheet.

In another aspect, the present invention provides a porous membrane molded into a single layer using the polyolefin resin composition.

The porous membrane may be prepared by using a dry method with respect to the polyolefin resin composition, wherein, for example, a polymer crystal portion may be oriented in a predetermined direction, and then a relatively weak amorphous portion may be ruptured through cold stretching to form pores. In one embodiment, the porous membrane may be prepared using the polyolefin resin composition, wherein the polyolefin resin composition is extruded in a T-die manner at a temperature of 200° C. to 300° C. with a twin-screw extruder to form a sheet, and the sheet is simultaneously and sequentially stretched in MD and TD directions in a stretching machine to be molded into a porous membrane.

Hereinafter, the present invention will be described in more detail through specific Examples and Comparative Examples. In Examples and Comparative Examples, the density and melt flow index were measured according to the following methods.

[Measurement Method]
(1) Density
Measurements were made in accordance with ASTM D1505.
(2) Melt Flow Index (MI)
Measurements were made in accordance with ASTM D1238 under a load condition of 2.16 kg, except that a high-density polyethylene was measured under a condition of 190° C., and a high-crystallinity polypropylene was measured under a condition of 230° C.

Example 1

70 wt % of a high-density polyethylene (density 0.967 g/cm$^3$, MI 0.7 g/10 min, crystallization temperature 119° C., degree of crystallinity 75%) and 30 wt % of a high-crystallinity polypropylene (MI 8 g/10 min, degree of crystallinity 55%, tacticity 96%) were physically mixed, melt-kneaded with a twin-screw extruder, and then solidified through cooling to prepare a polyolefin resin composition for a porous membrane in a pellet form.

Examples 2, 3, and 6, and Comparative Examples 1 to 3

A polyolefin resin composition for a porous membrane was prepared in the same manner as in Example 1, except that the compositions of the high-density polyethylene and the high-crystallinity polypropylene were set to the conditions in Table 1 below.

Example 4

50 wt % of a high-density polyethylene (density 0.954 g/cm$^3$, MI 0.95 g/10 min, crystallization temperature 116° C., degree of crystallinity 67%) and 50 wt % of a high-crystallinity polypropylene (MI 8 g/10 min, degree of crystallinity 55%, tacticity 96%) were physically mixed, melt-kneaded with a twin-screw extruder, and then solidified through cooling to prepare a polyolefin resin composition for a porous membrane in a pellet form.

Example 5

50 wt % of a high-density polyethylene (density 0.967 g/cm$^3$, MI 0.7 g/10 min, crystallization temperature 119° C., degree of crystallinity 75%) and 50 wt % of a high-crystallinity polypropylene (MI 11 g/10 min, degree of crystallinity 52%, tacticity 95%) were physically mixed, melt-kneaded with a twin-screw extruder, and then solidified through cooling to prepare a polyolefin resin composition for a porous membrane in a pellet form.

Test Example

The resin composition prepared above was extruded in a T-die manner at 220° C. to 250° C. with a twin-screw extruder to be molded into a sheet, and then the sheet was sequentially stretched in MD and TD directions in a stretching machine to prepare a single-layered porous film having a thickness of 15 μm, and the puncture strength, shutdown temperature, and meltdown temperature of the porous film were measured according to the following methods, and the results are shown in Table 1 below.

[Method for Measuring Puncture Strength]
A specimen of the porous membrane prepared above, the specimen having a size of 50×50 mm, was placed on a plate with a hole having a diameter of 10 mm and pressed with a 1 mm probe to measure a force by which the specimen was punctured, and the force was evaluated as the puncture strength.

[Method for Measuring Shutdown Temperature and Meltdown Temperature]
A lithium ion secondary battery manufactured using the porous film prepared above was heated in an oven at a rate of 2° C./min to measure resistance in real time, and the temperature at a point of time at which the resistance exceeded 10,000Ω was evaluated as a shutdown temperature, and the temperature at a point of time at which the resistance rapidly decreased after the shutdown temperature was evaluated as a meltdown temperature.

TABLE 1

| Classification | Unit | Examples 1 | Example 2 | Example 3 | Example 4 | Example 5 | Comparative Examples 1 | Comparative Examples 2 | Comparative Examples 3 | Example 6 |
|---|---|---|---|---|---|---|---|---|---|---|
| High-density polyethylene | wt % | 70 | 50 | 30 | 50 | 50 | 100 | 0 | 80 | 20 |
| Highly-crystalline polypropylene | wt % | 30 | 50 | 70 | 50 | 50 | 0 | 100 | 20 | 80 |

TABLE 1-continued

| Classification | Unit | Examples 1 | Example 2 | Example 3 | Example 4 | Example 5 | Comparative Examples 1 | Comparative Examples 2 | Comparative Examples 3 | Example 6 |
|---|---|---|---|---|---|---|---|---|---|---|
| Shutdown temperature | ° C. | 133 | 134.5 | 135 | 132 | 132 | 133 | 163 | 133 | 136 |
| Meltdown temperature | ° C. | 165 | 165 | 165 | 162 | 161 | 133 | 165 | 162 | 165 |
| Fxilm thickness | μm | 15 | 15 | 15 | 15 | 15 | 15 | 15 | 15 | 15 |
| Puncture strength | gf | 550 | 560 | 580 | 540 | 530 | 500 | 600 | 510 | 590 |

Referring to Table 1, when a high-density polyethylene having specific flowability and crystalline properties and a high-crystallinity polypropylene having specific flowability are mixed at a specific ratio according to the present invention (Examples 1 to 3), the shutdown temperature is at a level of 136° C. or lower, the meltdown temperature is at a level of 165° C. or higher, and the puncture strength is at a level of 550 gf or greater, so that it can be confirmed that it is possible to prepare a high-strength porous membrane while implementing excellent shutdown and meltdown properties even by molding a single-layered membrane. However, when the degree of crystallinity of a high-density polyethylene is out of the preferred range (Example 4) or the degree of crystallinity and flowability of a high-crystallinity polypropylene are out of the preferred range (Example 5), from the fact that the shutdown and meltdown properties and puncture strength are slightly degraded, it can be seen that there is an ideal flowability and crystalline properties sections of the high-density polyethylene and the high-crystallinity polypropylene for implementing a high-strength porous membrane together with excellent shutdown and meltdown properties.

In this regard, it can be seen that when the content of a high-crystallinity polypropylene does not reach a predetermined level (Comparative Examples 1 and 3), the meltdown properties or strength properties are significantly degraded, and when the content of a high-density polyethylene does not reach a predetermined level (Comparative Example 2), the shutdown properties are significantly degraded.

The preferred embodiments of the present invention have been described in detail. The description of the present invention has been presented for purposes of illustration, and it will be understood by those skilled in the art that various changes in form and details may be made therein without departing from the spirit and scope of the invention.

Therefore, the scope of the present invention is represented by the following claims rather than the above detailed description, and all changes and changed forms derived from the meaning, scope, and equivalent concepts of the claims should be construed as being included in the scope of the present invention.

The invention claimed is:

1. A polyolefin resin composition for a porous membrane, the polyolefin resin composition comprising:
    20 wt % to 70 wt % of a high-density polyethylene having a melt flow index (190° C., 2.16 kg load) of 0.5 g/10 min to 1.5 g/10 min, a crystallization temperature of 115° C. to 125° C., and a degree of crystallinity of 75% or greater; and
    30 wt % to 80 wt % of a high-crystallinity polypropylene having a melt flow index (230° C., 2.16 kg load) of 6 g/10 min to 10 g/10 min.

2. The polyolefin resin composition for a porous membrane of claim 1, wherein the resin composition has a shutdown temperature of 140° C. or lower, a meltdown temperature of 160° C. or higher, and a puncture strength of 520 gf or greater.

* * * * *